US012267299B2

(12) United States Patent
Zink et al.

(10) Patent No.: US 12,267,299 B2
(45) Date of Patent: Apr. 1, 2025

(54) PREEMPTIVE THREAT DETECTION FOR AN INFORMATION SYSTEM

(71) Applicant: Bank of America Corporation, Charlotte, NC (US)

(72) Inventors: Robert Riley Zink, Golden, CO (US); Matthew E. Kelly, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 367 days.

(21) Appl. No.: 17/574,380

(22) Filed: Jan. 12, 2022

(65) Prior Publication Data

US 2023/0224275 A1 Jul. 13, 2023

(51) Int. Cl.
*H04L 9/40* (2022.01)

(52) U.S. Cl.
CPC .......... *H04L 63/0236* (2013.01); *H04L 63/10* (2013.01); *H04L 63/1408* (2013.01); *H04L 63/1416* (2013.01); *H04L 63/1425* (2013.01); *H04L 63/1433* (2013.01); *H04L 63/1441* (2013.01)

(58) Field of Classification Search
None
See application file for complete search history.

(56) References Cited

U.S. PATENT DOCUMENTS

| 6,609,198 B1 * | 8/2003 | Wood | G06F 21/6209 726/8 |
| 6,668,322 B1 * | 12/2003 | Wood | G06F 21/41 713/182 |
| 6,691,232 B1 * | 2/2004 | Wood | H04L 63/0815 726/6 |
| 6,742,128 B1 * | 5/2004 | Joiner | H04L 63/1433 726/25 |

(Continued)

FOREIGN PATENT DOCUMENTS

| WO | 0223805 A2 | 3/2002 |
| WO | 2012011070 A1 | 1/2012 |

(Continued)

OTHER PUBLICATIONS

Dooley et al "DNS Security Management," Wiley-IEEE Press, pp. 1-324 (Year: 2017).*

(Continued)

*Primary Examiner* — Luu T Pham
*Assistant Examiner* — James J Wilcox

(57) ABSTRACT

A device configured to receive a data sample about a configuration for one or more network devices in a public network. The device is further configured to compare one or more threat indicators to the data sample where each threat indicator is associated with a configuration setting. The device is further configured to identify a first network device in the public network that comprises a configuration that matches a threat indicator and to generate a bad actor profile for the first network device. The device is further configured (Continued)

to receive data traffic for a second network device in a private network and to block data communications between the second network device in the private network and the first network device in the public network in response to determining that the first network device is associated with the bad actor profile.

17 Claims, 3 Drawing Sheets

(56) References Cited

U.S. PATENT DOCUMENTS

| | | | |
|---|---|---|---|
| 6,807,569 B1* | 10/2004 | Bhimani | H04L 63/1425 705/64 |
| 6,892,307 B1* | 5/2005 | Wood | H04L 9/3263 726/8 |
| 7,028,338 B1* | 4/2006 | Norris | H04L 63/1425 713/188 |
| 7,571,483 B1* | 8/2009 | Bascle | H04L 63/1408 726/24 |
| 7,584,508 B1* | 9/2009 | Kashchenko | G06F 21/577 726/25 |
| 7,735,116 B1* | 6/2010 | Gauvin | H04L 63/102 713/153 |
| 7,840,958 B1 | 11/2010 | Wan | |
| 7,849,507 B1* | 12/2010 | Bloch | H04L 63/168 726/22 |
| 8,117,657 B1* | 2/2012 | Elrod | H04L 63/0236 713/153 |
| 8,156,541 B1 | 4/2012 | Thomas et al. | |
| 8,161,548 B1 | 4/2012 | Wan | |
| 8,181,253 B1* | 5/2012 | Zaitsev | H04L 63/1433 726/1 |
| 8,488,488 B1* | 7/2013 | Hermanns | H04L 63/14 370/254 |
| 8,578,499 B1* | 11/2013 | Zhu | G06F 21/567 713/188 |
| 8,661,102 B1 | 2/2014 | Steiner et al. | |
| 8,726,379 B1* | 5/2014 | Stiansen | H04L 63/1441 726/25 |
| 8,745,734 B1* | 6/2014 | Brandwine | H04L 63/1408 726/25 |
| 8,800,044 B2* | 8/2014 | Raad | H04L 61/4511 370/252 |
| 8,813,234 B1* | 8/2014 | Bowers | G06F 21/552 726/25 |
| 8,918,785 B1* | 12/2014 | Brandwine | G06F 9/455 718/1 |
| 9,009,334 B1* | 4/2015 | Jenkins | G06F 21/50 709/219 |
| 9,100,428 B1* | 8/2015 | Visbal | H04L 63/14 |
| 9,117,069 B2* | 8/2015 | Oliphant | H04L 63/1433 |
| 9,124,617 B2 | 9/2015 | Palumbo et al. | |
| 9,137,210 B1* | 9/2015 | Joglekar | H04L 63/0442 |
| 9,148,441 B1* | 9/2015 | Tamersoy | G06F 21/566 |
| 9,208,316 B1* | 12/2015 | Hill | H04L 63/1416 |
| 9,325,732 B1* | 4/2016 | Stickle | H04L 63/1408 |
| 9,336,385 B1* | 5/2016 | Spencer | H04L 63/1441 |
| 9,378,361 B1* | 6/2016 | Yen | H04L 63/14 |
| 9,413,722 B1* | 8/2016 | Ahn | H04L 63/0263 |
| 9,467,435 B1* | 10/2016 | Tyler | H04L 51/212 |
| 9,516,053 B1* | 12/2016 | Muddu | G06F 3/0484 |
| 9,571,510 B1* | 2/2017 | Shen | H04L 63/306 |
| 9,584,541 B1* | 2/2017 | Weinstein | H04L 63/1441 |
| 9,609,460 B2* | 3/2017 | Sinha | H04L 63/20 |
| 9,641,544 B1* | 5/2017 | Treat | H04L 43/04 |
| 9,680,861 B2 | 6/2017 | Ward et al. | |
| 9,692,789 B2* | 6/2017 | Kirti | H04L 63/1425 |
| 9,762,582 B1* | 9/2017 | Hockings | G06F 21/577 |
| 9,800,590 B1* | 10/2017 | Gates | H04L 67/30 |
| 9,838,407 B1 | 12/2017 | Oprea et al. | |
| 9,894,088 B2 | 2/2018 | Ward et al. | |
| 9,948,671 B2 | 4/2018 | Perdisci et al. | |
| 9,954,881 B1* | 4/2018 | Lin | H04L 67/535 |
| 9,998,480 B1* | 6/2018 | Gates | G06F 21/577 |
| 10,033,747 B1* | 7/2018 | Paithane | G06F 21/566 |
| 10,045,217 B2* | 8/2018 | Stan | H04L 63/1408 |
| 10,069,847 B2* | 9/2018 | Bonney | G06Q 10/06 |
| 10,084,806 B2 | 9/2018 | Ward et al. | |
| 10,104,102 B1 | 10/2018 | Neumann | |
| 10,116,679 B1* | 10/2018 | Wu | H04L 63/102 |
| 10,158,653 B1* | 12/2018 | Magcale | H04L 63/1441 |
| 10,158,677 B1* | 12/2018 | DiCorpo | H04L 63/145 |
| 10,237,283 B2 | 3/2019 | Zhang et al. | |
| 10,257,227 B1* | 4/2019 | Stickle | G06F 21/577 |
| 10,298,598 B1 | 5/2019 | Mcclintock et al. | |
| 10,326,796 B1 | 6/2019 | Varadarajan et al. | |
| 10,341,856 B2* | 7/2019 | Weinberg | H04W 12/02 |
| 10,419,469 B1* | 9/2019 | Singh | H04L 67/535 |
| 10,521,584 B1* | 12/2019 | Sharifi Mehr | H04L 63/1433 |
| 10,565,372 B1* | 2/2020 | Stickle | G06F 21/55 |
| 10,652,266 B1* | 5/2020 | Tautschnig | H04L 63/1441 |
| 10,726,125 B2 | 7/2020 | Zhang et al. | |
| 10,735,466 B2 | 8/2020 | Wright | |
| 10,764,313 B1* | 9/2020 | Mushtaq | G06N 20/00 |
| 10,764,434 B1* | 9/2020 | Yoskowitz | H04L 61/45 |
| 10,785,258 B2 | 9/2020 | Lam | |
| 10,826,931 B1* | 11/2020 | Quan | H04L 63/1441 |
| 10,826,939 B2 | 11/2020 | Hodgman et al. | |
| 10,839,703 B2 | 11/2020 | Bodnariuc | |
| 10,862,907 B1* | 12/2020 | Pon | G06F 16/955 |
| 10,873,578 B1* | 12/2020 | Rose | H04L 67/02 |
| 10,887,333 B1* | 1/2021 | Pereira | G06F 21/55 |
| 10,904,277 B1* | 1/2021 | Sharifi Mehr | H04L 63/1425 |
| 10,951,606 B1* | 3/2021 | Shahidzadeh | H04L 63/107 |
| 10,965,674 B1* | 3/2021 | Zigman | G06F 21/78 |
| 11,082,441 B1* | 8/2021 | Bouguerra | G06N 3/045 |
| 11,100,217 B1* | 8/2021 | Natanzon | H04L 41/0869 |
| 11,159,546 B1* | 10/2021 | Moore | H04L 63/1466 |
| 11,290,489 B2* | 3/2022 | Xing | H04L 63/145 |
| 11,303,633 B1* | 4/2022 | Williams | H04L 63/083 |
| 11,329,998 B1* | 5/2022 | Shahidzadeh | H04L 63/14 |
| 11,336,674 B2* | 5/2022 | Kair | H04L 63/1408 |
| 11,444,974 B1* | 9/2022 | Shakhzadyan | G06F 21/577 |
| 11,516,222 B1* | 11/2022 | Srinivasan | G06F 21/577 |
| 11,522,884 B1* | 12/2022 | Vashisht | H04L 63/1433 |
| 11,558,189 B2* | 1/2023 | Garcia Valenzuela | H04L 63/10 |
| 11,611,580 B1* | 3/2023 | Sharifi Mehr | H04L 63/1408 |
| 11,677,786 B1* | 6/2023 | Vashisht | H04L 63/1433 726/22 |
| 11,838,300 B1* | 12/2023 | Vashisht | H04L 63/1416 |
| 2002/0066034 A1 | 5/2002 | Schlossberg et al. | |
| 2002/0112185 A1* | 8/2002 | Hodges | H04L 63/105 709/224 |
| 2002/0133603 A1 | 9/2002 | Mitomo et al. | |
| 2003/0172167 A1* | 9/2003 | Judge | H04L 63/0236 709/229 |
| 2003/0172294 A1* | 9/2003 | Judge | H04L 63/0245 726/13 |
| 2003/0217283 A1 | 11/2003 | Hrastar et al. | |
| 2004/0064726 A1* | 4/2004 | Girouard | G06F 21/577 726/25 |
| 2004/0102923 A1* | 5/2004 | Tracy | H04L 63/1433 702/181 |
| 2004/0103309 A1* | 5/2004 | Tracy | H04L 63/1433 726/25 |
| 2004/0107219 A1* | 6/2004 | Rosenberger | H04L 43/00 |
| 2004/0128543 A1 | 7/2004 | Blake et al. | |
| 2005/0086197 A1* | 4/2005 | Boubez | H04L 67/02 |
| 2005/0193430 A1* | 9/2005 | Cohen | H04L 63/1433 726/25 |
| 2006/0075504 A1* | 4/2006 | Liu | G06F 11/2294 726/25 |
| 2006/0101515 A1 | 5/2006 | Amoroso et al. | |
| 2006/0117385 A1* | 6/2006 | Mester | G06F 21/552 726/22 |
| 2006/0130142 A1* | 6/2006 | Mester | H04L 51/212 726/23 |
| 2006/0212942 A1 | 9/2006 | Barford et al. | |

(56) References Cited

U.S. PATENT DOCUMENTS

| | | | |
|---|---|---|---|
| 2006/0242701 A1 | 10/2006 | Black et al. | |
| 2007/0067841 A1 | 3/2007 | Yegneswaran et al. | |
| 2007/0094725 A1* | 4/2007 | Borders | H04L 63/1408 726/13 |
| 2007/0094728 A1 | 4/2007 | Julisch et al. | |
| 2007/0097963 A1 | 5/2007 | Thermos | |
| 2007/0100768 A1* | 5/2007 | Boccon-Gibod | G06Q 20/202 705/59 |
| 2007/0101405 A1* | 5/2007 | Engle | H04L 63/20 709/225 |
| 2007/0177615 A1* | 8/2007 | Miliefsky | H04L 63/1408 370/401 |
| 2007/0185814 A1* | 8/2007 | Boccon-Gibod | H04L 9/3242 705/51 |
| 2007/0186284 A1* | 8/2007 | McConnell | H04L 63/1425 726/25 |
| 2007/0192863 A1* | 8/2007 | Kapoor | H04L 67/10 726/23 |
| 2007/0220602 A1* | 9/2007 | Ricks | G06F 21/554 726/22 |
| 2007/0271614 A1 | 11/2007 | Capalik | |
| 2008/0016570 A1 | 1/2008 | Capalik | |
| 2008/0034424 A1* | 2/2008 | Overcash | H04L 63/1416 726/22 |
| 2008/0044018 A1 | 2/2008 | Scrimsher et al. | |
| 2008/0047009 A1* | 2/2008 | Overcash | H04L 63/1408 726/23 |
| 2008/0168135 A1* | 7/2008 | Redlich | G06F 21/6218 709/204 |
| 2008/0229415 A1* | 9/2008 | Kapoor | H04L 63/14 726/22 |
| 2008/0244691 A1* | 10/2008 | Hilerio | H04L 63/20 726/1 |
| 2008/0262990 A1* | 10/2008 | Kapoor | H04L 63/145 706/20 |
| 2008/0262991 A1* | 10/2008 | Kapoor | H04L 63/14 706/20 |
| 2008/0263197 A1* | 10/2008 | Stephens | H04L 63/126 709/224 |
| 2008/0271143 A1* | 10/2008 | Stephens | H04L 63/1425 726/22 |
| 2009/0158428 A1* | 6/2009 | Wang | H04L 63/1408 726/22 |
| 2009/0158430 A1* | 6/2009 | Borders | G06F 21/552 726/23 |
| 2009/0178139 A1* | 7/2009 | Stute | H04L 63/1433 726/22 |
| 2009/0241173 A1 | 9/2009 | Troyansky | |
| 2009/0241190 A1 | 9/2009 | Todd et al. | |
| 2009/0325615 A1* | 12/2009 | McKay | H04W 4/14 455/466 |
| 2010/0071054 A1 | 3/2010 | Hart | |
| 2010/0159877 A1* | 6/2010 | Salkini | H04L 63/10 455/461 |
| 2010/0159879 A1* | 6/2010 | Salkini | H04W 12/082 455/26.1 |
| 2010/0169971 A1* | 7/2010 | Raviv | H04L 63/1408 726/23 |
| 2010/0250497 A1* | 9/2010 | Redlich | G06Q 10/06 707/661 |
| 2010/0269175 A1 | 10/2010 | Stolfo et al. | |
| 2011/0213869 A1* | 9/2011 | Korsunsky | G06F 21/55 709/223 |
| 2011/0214157 A1* | 9/2011 | Korsunsky | H04L 63/1458 726/1 |
| 2011/0214182 A1* | 9/2011 | Adams | H04L 63/1408 726/23 |
| 2011/0219035 A1* | 9/2011 | Korsunsky | H04L 63/102 707/E17.005 |
| 2011/0231510 A1* | 9/2011 | Korsunsky | G06F 21/55 709/213 |
| 2011/0231564 A1* | 9/2011 | Korsunsky | H04L 63/1483 709/231 |
| 2011/0238855 A1* | 9/2011 | Korsunsky | H04L 63/1441 709/231 |
| 2011/0239303 A1* | 9/2011 | Owens, Jr. | H04L 63/1408 726/25 |
| 2011/0247058 A1* | 10/2011 | Kisters | G06F 21/31 726/5 |
| 2011/0283359 A1* | 11/2011 | Prince | H04L 63/102 726/23 |
| 2011/0302663 A1* | 12/2011 | Prodan | H04L 41/32 711/E12.091 |
| 2012/0023576 A1* | 1/2012 | Sorensen | G06F 21/55 726/22 |
| 2012/0144492 A1* | 6/2012 | Griffin | G06F 21/56 726/25 |
| 2012/0151559 A1* | 6/2012 | Koudys | G06F 21/316 726/23 |
| 2012/0221721 A1 | 8/2012 | Bhatt et al. | |
| 2012/0240185 A1* | 9/2012 | Kapoor | H04L 41/0866 726/1 |
| 2012/0260343 A1 | 10/2012 | Sun et al. | |
| 2012/0311703 A1* | 12/2012 | Yanovsky | H04L 51/212 726/26 |
| 2012/0324242 A1* | 12/2012 | Kirsch | G06Q 20/405 713/189 |
| 2013/0029630 A1* | 1/2013 | Salkini | H04W 48/04 455/404.1 |
| 2013/0138428 A1* | 5/2013 | Chandramouli | H04L 63/1416 704/9 |
| 2013/0205361 A1* | 8/2013 | Narayanaswamy | H04L 63/1408 726/1 |
| 2013/0263280 A1* | 10/2013 | Cote | G06F 3/04886 726/26 |
| 2013/0298244 A1* | 11/2013 | Kumar | G06F 21/51 726/25 |
| 2013/0305357 A1* | 11/2013 | Ayyagari | H04L 41/069 726/22 |
| 2013/0318603 A1* | 11/2013 | Merza | H04L 61/4511 726/22 |
| 2013/0326620 A1* | 12/2013 | Merza | H04L 63/1416 726/22 |
| 2013/0333028 A1* | 12/2013 | Hagar | H04L 63/1483 726/22 |
| 2014/0007238 A1* | 1/2014 | Magee | G06F 21/577 726/24 |
| 2014/0096251 A1* | 4/2014 | Doctor | H04L 63/1441 726/23 |
| 2014/0108652 A1* | 4/2014 | Richard | G06F 9/45558 709/224 |
| 2014/0123222 A1* | 5/2014 | Omar | H04L 63/102 726/3 |
| 2014/0157417 A1* | 6/2014 | Grubel | H04L 63/20 726/25 |
| 2014/0173731 A1* | 6/2014 | Mantripragada | H04L 12/6418 726/22 |
| 2014/0214938 A1* | 7/2014 | Bhatt | H04L 63/1408 709/204 |
| 2014/0259170 A1* | 9/2014 | Amsler | H04L 63/1408 726/23 |
| 2014/0282977 A1* | 9/2014 | Madhu | H04L 63/1433 726/7 |
| 2014/0283085 A1* | 9/2014 | Maestas | H04L 63/1433 726/25 |
| 2014/0298419 A1* | 10/2014 | Boubez | H04L 63/08 726/4 |
| 2014/0310739 A1* | 10/2014 | Ricci | G06Q 30/0633 725/75 |
| 2014/0344926 A1* | 11/2014 | Cunningham | G06F 21/554 726/22 |
| 2014/0351316 A1* | 11/2014 | Boubez | H04L 63/08 709/218 |
| 2014/0365418 A1* | 12/2014 | Grant | H04L 63/1441 706/52 |

(56) References Cited

U.S. PATENT DOCUMENTS

| | | | |
|---|---|---|---|
| 2015/0033287 A1* | 1/2015 | Oliphant | G06F 8/65 726/1 |
| 2015/0033323 A1* | 1/2015 | Oliphant | H04L 63/1433 726/13 |
| 2015/0033348 A1* | 1/2015 | Oliphant | G06F 21/57 726/25 |
| 2015/0033349 A1* | 1/2015 | Oliphant | G06F 21/57 726/25 |
| 2015/0033350 A1* | 1/2015 | Oliphant | H04L 63/1416 726/25 |
| 2015/0033351 A1* | 1/2015 | Oliphant | G06F 21/554 726/25 |
| 2015/0033352 A1* | 1/2015 | Oliphant | H04L 63/20 726/25 |
| 2015/0033353 A1* | 1/2015 | Oliphant | H04L 63/1433 726/25 |
| 2015/0040230 A1* | 2/2015 | Oliphant | H04L 63/1441 726/25 |
| 2015/0040231 A1* | 2/2015 | Oliphant | G06F 21/50 726/25 |
| 2015/0040232 A1* | 2/2015 | Oliphant | H04L 63/0281 726/25 |
| 2015/0040233 A1* | 2/2015 | Oliphant | H04L 63/1433 726/25 |
| 2015/0047008 A1* | 2/2015 | Undernehr | H04L 63/1441 726/22 |
| 2015/0096019 A1* | 4/2015 | Davis | H04L 63/145 726/23 |
| 2015/0106889 A1 | 4/2015 | Sharabani et al. | |
| 2015/0121528 A1* | 4/2015 | Crowley | H04L 63/1441 726/23 |
| 2015/0127832 A1* | 5/2015 | Kirner | H04L 63/083 709/225 |
| 2015/0128274 A1* | 5/2015 | Giokas | H04L 51/212 726/23 |
| 2015/0150124 A1* | 5/2015 | Zhang | G06F 21/51 726/22 |
| 2015/0178496 A1* | 6/2015 | Kohlenberg | G06F 21/552 726/23 |
| 2015/0195299 A1* | 7/2015 | Zoldi | H04L 63/1408 726/25 |
| 2015/0207809 A1* | 7/2015 | Macaulay | H04L 63/1433 726/22 |
| 2015/0229656 A1* | 8/2015 | Shieh | H04L 63/1491 726/22 |
| 2015/0249685 A1* | 9/2015 | Crane | H04L 63/1433 726/1 |
| 2015/0264072 A1* | 9/2015 | Savchuk | H04L 63/1433 726/23 |
| 2015/0281260 A1* | 10/2015 | Arcamone | H04L 63/1425 726/11 |
| 2015/0288709 A1* | 10/2015 | Singhal | H04L 63/1408 726/23 |
| 2015/0295948 A1* | 10/2015 | Hassell | H04L 63/1441 726/25 |
| 2015/0319185 A1* | 11/2015 | Kirti | H04L 63/1416 726/23 |
| 2015/0332054 A1* | 11/2015 | Eck | H04L 63/1416 726/25 |
| 2015/0347750 A1* | 12/2015 | Lietz | G06F 21/577 726/23 |
| 2016/0006756 A1* | 1/2016 | Ismael | H04L 63/1441 726/22 |
| 2016/0021117 A1* | 1/2016 | Harmon | H04L 63/20 726/1 |
| 2016/0036816 A1* | 2/2016 | Srinivasan | H04L 63/1425 726/1 |
| 2016/0044054 A1 | 2/2016 | Stiansen et al. | |
| 2016/0057167 A1* | 2/2016 | Bach | H04L 63/101 726/23 |
| 2016/0065598 A1* | 3/2016 | Modi | H04L 63/1408 726/23 |
| 2016/0065610 A1* | 3/2016 | Peteroy | H04L 63/0421 713/153 |
| 2016/0072770 A1* | 3/2016 | Crane | H04L 63/1441 726/22 |
| 2016/0078225 A1* | 3/2016 | Ray | G06F 21/552 726/23 |
| 2016/0080399 A1* | 3/2016 | Harris | H04L 63/1433 726/23 |
| 2016/0080417 A1* | 3/2016 | Thomas | H04L 63/1416 726/1 |
| 2016/0080418 A1* | 3/2016 | Ray | H04L 63/1416 726/1 |
| 2016/0080419 A1* | 3/2016 | Schiappa | H04L 63/1441 726/1 |
| 2016/0080420 A1* | 3/2016 | Ray | H04L 63/1408 726/1 |
| 2016/0094580 A1* | 3/2016 | Handel | H04L 63/1408 726/23 |
| 2016/0119365 A1* | 4/2016 | Barel | G06F 16/95 726/12 |
| 2016/0164916 A1* | 6/2016 | Satish | H04L 63/0236 |
| 2016/0182454 A1* | 6/2016 | Phonsa | H04L 63/0263 726/11 |
| 2016/0182546 A1* | 6/2016 | Coates | H04L 63/14 726/23 |
| 2016/0191465 A1* | 6/2016 | Thomas | H04L 63/0263 726/1 |
| 2016/0191476 A1* | 6/2016 | Schütz | H04L 9/0891 713/165 |
| 2016/0196628 A1* | 7/2016 | Crowley | G06Q 50/265 705/325 |
| 2016/0197941 A1* | 7/2016 | Smith | H04L 63/1408 726/22 |
| 2016/0197951 A1* | 7/2016 | Lietz | H04L 63/0227 726/23 |
| 2016/0226905 A1* | 8/2016 | Baikalov | H04L 63/1433 |
| 2016/0241574 A1* | 8/2016 | Kumar | H04L 63/12 |
| 2016/0269434 A1* | 9/2016 | DiValentin | H04L 63/1441 |
| 2016/0294854 A1* | 10/2016 | Parthasarathi | H04L 63/1408 |
| 2016/0294860 A1* | 10/2016 | Hathaway | H04L 63/1433 |
| 2016/0295410 A1* | 10/2016 | Gupta | H04W 12/06 |
| 2016/0300227 A1* | 10/2016 | Subhedar | G06Q 20/384 |
| 2016/0308890 A1* | 10/2016 | Weilbacher | G06F 21/577 |
| 2016/0308898 A1* | 10/2016 | Teeple | H04L 63/1408 |
| 2016/0337384 A1* | 11/2016 | Jansson | H04L 65/1045 |
| 2016/0359900 A1* | 12/2016 | Crisler | H04L 63/1408 |
| 2016/0381027 A1* | 12/2016 | Mitchell | G06F 11/3062 726/3 |
| 2017/0013008 A1* | 1/2017 | Carey | H04L 63/02 |
| 2017/0026401 A1* | 1/2017 | Polyakov | H04L 63/20 |
| 2017/0048276 A1* | 2/2017 | Bailey | G06F 3/0482 |
| 2017/0063920 A1* | 3/2017 | Thomas | H04L 9/32 |
| 2017/0091482 A1* | 3/2017 | Sarin | G06F 21/55 |
| 2017/0104782 A1* | 4/2017 | Folco | H04L 63/1433 |
| 2017/0126728 A1* | 5/2017 | Beam | H04L 63/0263 |
| 2017/0126740 A1* | 5/2017 | Bejarano Ardila | H04L 63/1433 |
| 2017/0142144 A1* | 5/2017 | Weinberger | H04L 63/1408 |
| 2017/0149807 A1* | 5/2017 | Schilling | G06F 21/53 |
| 2017/0155683 A1* | 6/2017 | Singla | H04L 63/1441 |
| 2017/0163677 A1* | 6/2017 | Gordon | H04L 63/1408 |
| 2017/0171231 A1* | 6/2017 | Reybok, Jr. | H04L 63/1433 |
| 2017/0178025 A1* | 6/2017 | Thomas | H04L 63/1425 |
| 2017/0180421 A1* | 6/2017 | Shieh | H04L 63/10 |
| 2017/0187686 A1* | 6/2017 | Shaikh | H04L 63/1408 |
| 2017/0201537 A1* | 7/2017 | Caldwell | H04L 63/1416 |
| 2017/0214701 A1* | 7/2017 | Hasan | H04L 63/1433 |
| 2017/0214707 A1* | 7/2017 | Grubel | G06F 21/564 |
| 2017/0214708 A1* | 7/2017 | Gukal | G06F 16/285 |
| 2017/0214709 A1* | 7/2017 | Maestas | H04L 63/1433 |
| 2017/0223046 A1* | 8/2017 | Singh | H04L 63/1491 |
| 2017/0230350 A1* | 8/2017 | Enrique Salpico | H04L 63/101 |
| 2017/0237752 A1* | 8/2017 | Ganguly | H04L 63/1416 726/25 |
| 2017/0237756 A1* | 8/2017 | Lietz | H04L 63/1433 726/23 |
| 2017/0243008 A1* | 8/2017 | Cornell | H04L 63/1408 |

(56) References Cited

U.S. PATENT DOCUMENTS

| | | | |
|---|---|---|---|
| 2017/0250953 A1* | 8/2017 | Jain | G06F 21/552 |
| 2017/0257397 A1* | 9/2017 | Graham | H04L 63/1433 |
| 2017/0277774 A1* | 9/2017 | Eigner | G06Q 30/0204 |
| 2017/0279819 A1* | 9/2017 | More | G06F 21/51 |
| 2017/0293906 A1* | 10/2017 | Komarov | G06F 21/554 |
| 2017/0310704 A1* | 10/2017 | Wu | H04L 63/1433 |
| 2017/0324709 A1* | 11/2017 | Ahn | H04L 63/1425 |
| 2017/0324768 A1* | 11/2017 | Crabtree | H04L 63/1433 |
| 2017/0331835 A1* | 11/2017 | Yu | G06F 21/577 |
| 2017/0331849 A1* | 11/2017 | Yu | H04L 63/10 |
| 2017/0346853 A1* | 11/2017 | Wyatt | H04W 12/122 |
| 2017/0353484 A1* | 12/2017 | Knapp | H04L 63/1416 |
| 2017/0359366 A1* | 12/2017 | Bushey | H04L 63/1408 |
| 2018/0018463 A1* | 1/2018 | Grossman | A63F 13/75 |
| 2018/0026944 A1* | 1/2018 | Phillips | H04L 63/1433 726/4 |
| 2018/0039922 A1* | 2/2018 | King-Wilson | H04L 63/0263 |
| 2018/0041529 A1* | 2/2018 | Mixer | H04L 63/0245 |
| 2018/0048660 A1* | 2/2018 | Paithane | G06F 21/566 |
| 2018/0063167 A1* | 3/2018 | Rodeck | H04L 63/083 |
| 2018/0063176 A1* | 3/2018 | Katrekar | H04L 43/10 |
| 2018/0063181 A1* | 3/2018 | Jones | G06F 21/577 |
| 2018/0063182 A1* | 3/2018 | Jones | H04L 63/1433 |
| 2018/0077183 A1* | 3/2018 | Swann | H04L 63/1425 |
| 2018/0077189 A1* | 3/2018 | Doppke | H04L 63/20 |
| 2018/0083785 A1* | 3/2018 | Shields | H04W 12/033 |
| 2018/0084012 A1* | 3/2018 | Joseph | H04L 63/1425 |
| 2018/0089676 A1* | 3/2018 | Narasimhan | G06Q 30/0269 |
| 2018/0103052 A1* | 4/2018 | Choudhury | H04L 63/20 |
| 2018/0115554 A1* | 4/2018 | Dyon | H04L 63/164 |
| 2018/0124072 A1* | 5/2018 | Hamdi | G06F 21/577 |
| 2018/0124094 A1* | 5/2018 | Hamdi | G06F 7/24 |
| 2018/0124095 A1* | 5/2018 | Hamdi | G06F 7/24 |
| 2018/0124099 A1* | 5/2018 | St. Pierre | H04L 63/20 |
| 2018/0176206 A1* | 6/2018 | Matthews | H04L 63/083 |
| 2018/0181763 A1* | 6/2018 | Gunda | G06F 21/50 |
| 2018/0189498 A1* | 7/2018 | Boutnaru | G06F 21/577 |
| 2018/0189502 A1* | 7/2018 | Kumar | H04L 9/0863 |
| 2018/0189697 A1* | 7/2018 | Thomson | H04L 63/1408 |
| 2018/0191684 A1* | 7/2018 | Hoy | H04L 63/101 |
| 2018/0191744 A1* | 7/2018 | Morales | H04L 63/1458 |
| 2018/0191747 A1* | 7/2018 | Nachenberg | H04L 63/1416 |
| 2018/0191763 A1* | 7/2018 | Hillard | H04L 63/1416 |
| 2018/0191771 A1* | 7/2018 | Newman | H04L 63/20 |
| 2018/0196960 A1* | 7/2018 | Gullicksen | H04L 63/107 |
| 2018/0205755 A1* | 7/2018 | Kavi | G06F 21/577 |
| 2018/0219914 A1* | 8/2018 | Reith | H04W 12/088 |
| 2018/0227315 A1* | 8/2018 | Taneja | H04L 63/1408 |
| 2018/0295154 A1* | 10/2018 | Crabtree | H04L 63/1433 |
| 2018/0309782 A1* | 10/2018 | Adams | H04L 9/3239 |
| 2018/0316706 A1* | 11/2018 | Tsironis | H04L 63/1408 |
| 2018/0316711 A1* | 11/2018 | Iyer | H04L 63/1433 |
| 2018/0337941 A1* | 11/2018 | Kraning | H04L 43/10 |
| 2018/0359270 A1* | 12/2018 | Chari | H04L 63/102 |
| 2018/0367561 A1* | 12/2018 | Givental | G06F 21/552 |
| 2019/0007447 A1* | 1/2019 | Barnes | H04L 63/304 |
| 2019/0007451 A1* | 1/2019 | Pierce | H04L 63/10 |
| 2019/0020676 A1* | 1/2019 | Laughlin | H04L 63/1441 |
| 2019/0021004 A1* | 1/2019 | Shanmugavadivel | H04W 12/08 |
| 2019/0028504 A1* | 1/2019 | Shtar | H04L 67/535 |
| 2019/0034660 A1* | 1/2019 | Ford | G06F 21/552 |
| 2019/0058702 A1* | 2/2019 | Kurian | H04L 63/205 |
| 2019/0089677 A1* | 3/2019 | Ashley | H04L 63/0263 |
| 2019/0098037 A1* | 3/2019 | Shenoy, Jr. | H04L 63/1441 |
| 2019/0104138 A1* | 4/2019 | Storms | H04L 63/1416 |
| 2019/0108333 A1* | 4/2019 | Licata | H04L 63/02 |
| 2019/0158513 A1* | 5/2019 | Shtar | G06F 21/552 |
| 2019/0163914 A1* | 5/2019 | Steele | H04L 63/20 |
| 2019/0165997 A1* | 5/2019 | Shaikh | H04L 41/40 |
| 2019/0166142 A1* | 5/2019 | Lee | H04L 63/1425 |
| 2019/0166154 A1* | 5/2019 | Steele | H04L 63/1408 |
| 2019/0173909 A1* | 6/2019 | Mixer | H04L 41/082 |
| 2019/0188395 A1* | 6/2019 | Cote | H04W 12/128 |
| 2019/0190930 A1* | 6/2019 | Miron | H04L 69/22 |
| 2019/0190961 A1* | 6/2019 | McGrew | H04L 63/1408 |
| 2019/0205317 A1* | 7/2019 | Tobias | G06F 40/174 |
| 2019/0205555 A1* | 7/2019 | Duffy | G06F 21/6218 |
| 2019/0222604 A1* | 7/2019 | Vaidya | H04L 63/1416 |
| 2019/0229998 A1* | 7/2019 | Cattoni | H04L 43/50 |
| 2019/0238583 A1* | 8/2019 | Vaidya | H04L 63/1491 |
| 2019/0260795 A1* | 8/2019 | Araiza | H04L 63/101 |
| 2019/0268350 A1* | 8/2019 | Salkini | H04H 20/59 |
| 2019/0311102 A1* | 10/2019 | Tussy | G06V 40/166 |
| 2019/0319980 A1* | 10/2019 | Levy | G06F 16/137 |
| 2019/0334929 A1* | 10/2019 | Teshome | H04L 63/1408 |
| 2019/0340339 A1* | 11/2019 | Moroney | G06F 21/565 |
| 2019/0349350 A1* | 11/2019 | Valites | G06F 21/6245 |
| 2019/0349407 A1* | 11/2019 | Luger | H04L 63/1408 |
| 2019/0372934 A1 | 12/2019 | Yehudai et al. | |
| 2019/0377902 A1* | 12/2019 | Schroeder | H04L 63/0414 |
| 2019/0379678 A1* | 12/2019 | McLean | G06F 16/285 |
| 2019/0379683 A1* | 12/2019 | Overby | H04W 4/48 |
| 2019/0379705 A1* | 12/2019 | Murphy | G06F 21/562 |
| 2019/0386969 A1* | 12/2019 | Verzun | G06F 21/606 |
| 2020/0004697 A1* | 1/2020 | Le Roy | G06F 21/76 |
| 2020/0007586 A1* | 1/2020 | Seeber | H04L 63/1441 |
| 2020/0014711 A1* | 1/2020 | Rego | H04L 63/1433 |
| 2020/0028876 A1* | 1/2020 | Cohen | H04L 63/1425 |
| 2020/0036739 A1* | 1/2020 | Novikov | G06N 20/00 |
| 2020/0045075 A1* | 2/2020 | Kliger | H04W 12/12 |
| 2020/0067961 A1* | 2/2020 | Qin | H04L 63/1408 |
| 2020/0074059 A1* | 3/2020 | Beckett, Jr. | G06F 21/36 |
| 2020/0076835 A1* | 3/2020 | Ladnai | H04L 63/1408 |
| 2020/0082081 A1* | 3/2020 | Sarin | H04W 12/08 |
| 2020/0084232 A1* | 3/2020 | Lebling | H04L 63/1441 |
| 2020/0084235 A1* | 3/2020 | Tang | H04L 63/1433 |
| 2020/0092335 A1* | 3/2020 | Brooks | G06F 9/542 |
| 2020/0106787 A1* | 4/2020 | Galinski | G06F 21/554 |
| 2020/0106793 A1* | 4/2020 | Vanamali | H04L 63/1433 |
| 2020/0112582 A1* | 4/2020 | Chakra | G06F 21/46 |
| 2020/0120126 A1* | 4/2020 | Ocepek | H04L 63/1433 |
| 2020/0120144 A1* | 4/2020 | Yadav | G06Q 20/382 |
| 2020/0137110 A1* | 4/2020 | Tyler | H04L 63/1483 |
| 2020/0145439 A1* | 5/2020 | Griggs | H04L 63/0227 |
| 2020/0177614 A1* | 6/2020 | Burns | H04L 63/1433 |
| 2020/0193047 A1* | 6/2020 | Moore | H04L 9/0643 |
| 2020/0213277 A1* | 7/2020 | Rudnik | H04L 12/4641 |
| 2020/0218221 A1* | 7/2020 | Gendelman | G06F 21/566 |
| 2020/0228551 A1* | 7/2020 | Dalal | H04L 63/1483 |
| 2020/0236119 A1* | 7/2020 | Chamarajnager | G06F 9/45558 |
| 2020/0250667 A1* | 8/2020 | Ow | G06Q 20/3829 |
| 2020/0259852 A1* | 8/2020 | Wolff | H04L 67/10 |
| 2020/0285737 A1* | 9/2020 | Kraus | G06F 21/552 |
| 2020/0287916 A1* | 9/2020 | Aksela | H04L 63/1408 |
| 2020/0296589 A1* | 9/2020 | Malik | H04W 28/0231 |
| 2020/0314067 A1* | 10/2020 | Rudnik | H04L 63/0272 |
| 2020/0314121 A1* | 10/2020 | Mittermaier | H04L 63/20 |
| 2020/0314126 A1* | 10/2020 | Schmugar | H04W 12/12 |
| 2020/0320211 A1* | 10/2020 | Moore | H04L 9/0894 |
| 2020/0322371 A1* | 10/2020 | Chesla | G06F 16/24578 |
| 2020/0329072 A1* | 10/2020 | Dubois | H04L 63/20 |
| 2020/0336508 A1* | 10/2020 | Srivastava | H04L 63/20 |
| 2020/0358738 A1* | 11/2020 | Mircescu | H04L 51/212 |
| 2020/0358801 A1* | 11/2020 | Allouche | H04L 63/123 |
| 2020/0358804 A1* | 11/2020 | Crabtree | H04L 63/1433 |
| 2020/0382527 A1* | 12/2020 | Mitelman | G06N 20/20 |
| 2020/0404490 A1* | 12/2020 | Thai | H04W 12/63 |
| 2021/0004597 A1* | 1/2021 | Dascola | G06F 3/013 |
| 2021/0006584 A1* | 1/2021 | Basballe Sorensen | G06Q 10/105 |
| 2021/0021629 A1* | 1/2021 | Dani | H04L 63/1433 |
| 2021/0029137 A1* | 1/2021 | Wright | H04L 63/08 |
| 2021/0029159 A1* | 1/2021 | Murphy | H04L 63/1441 |
| 2021/0035116 A1* | 2/2021 | Berrington | G06N 5/04 |
| 2021/0075820 A1* | 3/2021 | Murphy | H04L 67/30 |
| 2021/0092149 A1* | 3/2021 | Carlson | H04L 63/0236 |
| 2021/0092154 A1* | 3/2021 | Kumar | H04L 63/1425 |
| 2021/0105869 A1* | 4/2021 | Mo | G06Q 30/08 |
| 2021/0112054 A1* | 4/2021 | Bailey | H04L 63/10 |
| 2021/0112092 A1* | 4/2021 | Chen | H04L 63/101 |
| 2021/0144555 A1* | 5/2021 | Kim | H04L 63/1458 |
| 2021/0152538 A1* | 5/2021 | Kurian | H04L 63/105 |
| 2021/0160274 A1* | 5/2021 | Murphy | H04L 63/20 |

(56) References Cited

U.S. PATENT DOCUMENTS

| | | | |
|---|---|---|---|
| 2021/0160281 A1* | 5/2021 | Hallaji | G06N 20/00 |
| 2021/0185076 A1* | 6/2021 | Miller | H04L 63/107 |
| 2021/0185080 A1* | 6/2021 | Wang | H04L 63/1408 |
| 2021/0194911 A1* | 6/2021 | Hecht | H04L 63/1433 |
| 2021/0194925 A1* | 6/2021 | Xiao | H04L 63/0227 |
| 2021/0203674 A1* | 7/2021 | Azaria | H04L 63/1441 |
| 2021/0203681 A1* | 7/2021 | Shukla | H04L 63/1425 |
| 2021/0211452 A1* | 7/2021 | Patel | H04L 63/1416 |
| 2021/0234884 A1* | 7/2021 | Brown | H04L 63/1433 |
| 2021/0243204 A1* | 8/2021 | Taylor | H04L 63/1408 |
| 2021/0243223 A1* | 8/2021 | Arora | H04L 63/1491 |
| 2021/0248230 A1 | 8/2021 | Dodson | |
| 2021/0258336 A1* | 8/2021 | Clifford | H04L 63/102 |
| 2021/0273950 A1* | 9/2021 | Lawson | H04L 41/145 |
| 2021/0273957 A1* | 9/2021 | Boyer | H04L 63/1416 |
| 2021/0273960 A1* | 9/2021 | Humphrey | H04L 63/1425 |
| 2021/0273961 A1* | 9/2021 | Humphrey | H04L 63/1425 |
| 2021/0286899 A1* | 9/2021 | Schroeder | G06N 20/20 |
| 2021/0288951 A1* | 9/2021 | Rose | H04L 63/0861 |
| 2021/0306350 A1* | 9/2021 | Somol | H04L 63/14 |
| 2021/0306371 A1* | 9/2021 | Majkowski | H04L 63/1425 |
| 2021/0312026 A1* | 10/2021 | Rose | G06Q 20/065 |
| 2021/0314339 A1* | 10/2021 | Tsarfati | G06F 21/577 |
| 2021/0329032 A1* | 10/2021 | Shaw | H04L 63/1425 |
| 2021/0336991 A1* | 10/2021 | Couturier | H04L 63/20 |
| 2021/0344690 A1* | 11/2021 | Sharifi Mehr | G06F 16/25 |
| 2021/0349994 A1* | 11/2021 | Ravindra | G06F 21/577 |
| 2021/0352104 A1 | 11/2021 | Sampat et al. | |
| 2021/0367970 A1* | 11/2021 | Carpenter | H04L 63/1483 |
| 2021/0377278 A1* | 12/2021 | Yin | H04L 63/0227 |
| 2021/0392151 A1* | 12/2021 | Lakhani | H04L 63/20 |
| 2021/0398225 A1* | 12/2021 | Crabtree | G06Q 30/0611 |
| 2021/0409427 A1* | 12/2021 | Patel | G06F 21/552 |
| 2021/0409429 A1* | 12/2021 | Komashinskiy | G06N 20/00 |
| 2021/0409430 A1* | 12/2021 | Alford | H04L 67/133 |
| 2021/0409436 A1* | 12/2021 | Todd | H04L 63/1416 |
| 2022/0007192 A1* | 1/2022 | Shaw | H04L 63/0209 |
| 2022/0007194 A1* | 1/2022 | Shaw | H04L 63/20 |
| 2022/0019674 A1* | 1/2022 | Frey | G06F 21/554 |
| 2022/0021653 A1* | 1/2022 | Metz | H04L 63/168 |
| 2022/0021654 A1* | 1/2022 | Trentini | H04L 63/0272 |
| 2022/0060474 A1* | 2/2022 | Trentini | H04L 63/0236 |
| 2022/0070185 A1* | 3/2022 | Yang | H04L 63/1408 |
| 2022/0070222 A1* | 3/2022 | Rao | H04L 63/145 |
| 2022/0094705 A1* | 3/2022 | Tineo | H04L 63/1441 |
| 2022/0103581 A1* | 3/2022 | Bernholz | H04L 63/14 |
| 2022/0103681 A1* | 3/2022 | Prodanovic | H04W 12/069 |
| 2022/0109562 A1* | 4/2022 | Feola | H04L 63/0272 |
| 2022/0109681 A1* | 4/2022 | Hamdi | H04L 41/16 |
| 2022/0116398 A1* | 4/2022 | Rose | H04L 9/0891 |
| 2022/0116736 A1* | 4/2022 | Williams | A61B 5/4833 |
| 2022/0131835 A1* | 4/2022 | Fenton | H04L 63/1458 |
| 2022/0150269 A1* | 5/2022 | Eidissen | H04L 63/1433 |
| 2022/0159056 A1* | 5/2022 | Rose | G06F 21/32 |
| 2022/0164440 A1* | 5/2022 | Murphy | H04L 63/1441 |
| 2022/0164892 A1* | 5/2022 | Venter | G06Q 40/08 |
| 2022/0166801 A1* | 5/2022 | Murphy | H04L 63/145 |
| 2022/0174066 A1* | 6/2022 | Rose | H04L 63/08 |
| 2022/0210168 A1* | 6/2022 | Yavo | H04L 63/1433 |
| 2022/0224702 A1* | 7/2022 | Dherange | H04L 63/1433 |
| 2022/0239634 A1* | 7/2022 | Woodberg | H04L 63/1425 |
| 2022/0239671 A1* | 7/2022 | Wang | H04L 63/1433 |
| 2022/0247762 A1* | 8/2022 | Jasleen | G06F 18/214 |
| 2022/0255926 A1* | 8/2022 | Crabtree | H04L 63/1425 |
| 2022/0309197 A1* | 9/2022 | Dattani | G06Q 20/405 |
| 2022/0311770 A1* | 9/2022 | Shieh | H04L 63/083 |
| 2022/0321397 A1* | 10/2022 | Tormasov | H04L 63/1416 |
| 2022/0321533 A1* | 10/2022 | Zheng | H04L 61/251 |
| 2022/0360594 A1* | 11/2022 | Cosgrove | H04L 9/3247 |
| 2022/0368699 A1* | 11/2022 | Thomson | H04L 63/1483 |
| 2022/0368711 A1* | 11/2022 | Bladow | H04L 63/1433 |
| 2022/0385673 A1* | 12/2022 | Dong | H04L 63/1416 |
| 2022/0391508 A1* | 12/2022 | Garchery | G06F 21/55 |
| 2023/0011397 A1* | 1/2023 | Panse | H04L 63/20 |
| 2023/0020504 A1* | 1/2023 | Moon | G06N 20/00 |
| 2023/0024127 A1* | 1/2023 | Moon | G06F 9/547 |
| 2023/0088415 A1* | 3/2023 | Friedlander | H04L 63/1425 726/23 |
| 2023/0134546 A1* | 5/2023 | Gopalakrishnan | H04W 12/08 726/23 |
| 2023/0147714 A1* | 5/2023 | Shaik | H04L 63/20 726/25 |
| 2023/0155822 A1* | 5/2023 | Chen | H04B 10/70 257/14 |
| 2023/0169165 A1* | 6/2023 | Williams | H04L 63/10 726/1 |
| 2023/0171110 A1* | 6/2023 | Brown | H04L 9/3247 713/176 |
| 2023/0171212 A1* | 6/2023 | Hathaway | H04L 51/52 709/206 |
| 2023/0171266 A1* | 6/2023 | Brunner | H04L 63/1441 726/23 |
| 2023/0171271 A1* | 6/2023 | Williams | H04L 63/1425 726/22 |
| 2023/0171273 A1* | 6/2023 | Vaidya | H04L 63/101 726/23 |
| 2023/0179637 A1* | 6/2023 | Nunn | H04L 63/0236 726/1 |
| 2023/0188525 A1* | 6/2023 | Singh | H04L 63/101 726/29 |
| 2023/0188540 A1* | 6/2023 | Valluri | H04L 63/145 726/22 |
| 2023/0195863 A1* | 6/2023 | Xu | H04L 63/107 726/22 |
| 2023/0224146 A1* | 7/2023 | Stayskal | H04L 9/3066 380/28 |
| 2023/0224277 A1* | 7/2023 | Tarighat | H04L 63/1425 726/15 |
| 2024/0015175 A1* | 1/2024 | Hakala | H04L 63/102 |
| 2024/0330441 A1* | 10/2024 | Tiwari | G06F 21/554 |

FOREIGN PATENT DOCUMENTS

| | | | | | |
|---|---|---|---|---|---|
| WO | | 2016005273 A1 | | 1/2016 | |
| WO | WO-2017131963 A1 | * | 8/2017 | | H04L 41/145 |

OTHER PUBLICATIONS

Moriarty et al RFC8953 Coordinating Attack Response at Internet Scale 2 (CARIS2) Workshop Report, pp. 1-14 (Year: 2020).*

More et al "Real Time Threat Detection System in Cloud using Big Data Analytics," 2017 2nd IEEE International Conference on Recent Trends in Electronics Informaiton & Commnication Technology (RTEICT), IEEE, pp. 1262-1264 (Year: 2017).*

Quader et al "Persistent Threat Pattern Discovery," IEEE, pp. 179-181 (Year: 2015).*

Suliman et al "Network Intrusion Detection System Using Artifical Immune System (AIS)," 2018 3rd International Conference on Computer and Communication Systems, pp. 178-182 (Year: 2018).*

Tian et al "Design and Implementation of an Initiative and Passive Network Intrusion Detection System," Second International Symposium on Information Science and Engineering, IEEE Computer Society, pp. 196-198 (Year: 2009).*

* cited by examiner

PREEMPTIVE THREAT DETECTION FOR AN INFORMATION SYSTEM

TECHNICAL FIELD

The present disclosure relates generally to network security, and more specifically to preemptive threat detection for an information system.

BACKGROUND

In a network environment, network devices are in data communication with other network devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as computers, user devices, databases, and servers, are vulnerable to attacks. This vulnerability poses several network security challenges. Existing systems are typically unable to detect a network attack until after the attack has occurred. For example, a bad actor may connect to a network device in a private network which then allows the bad actor to gain unauthorized access to files or documents that are stored in the network device or the network. Having a delayed response allows the bad actor to gain access to sensitive information within the network and allows bad actors to perform other malicious activities such as data exfiltration or uploading malware.

SUMMARY

The disclosed system provides several practical applications and technical advantages that overcome the previously discussed technical problems. For example, the disclosed system provides a practical application by identifying network devices within a public network that correspond with potential bad actors. The information system is configured to generate a bad actor profile for any identified network devices or entities in the public network. The information system then uses the bad actor profiles to monitor data traffic within a private network and to prevent attacks within the private network. This process provides a technical improvement that improves information security by preemptively identifying and blocking communications with any network devices in the public network that are potential bad actors before they connect with or access network devices in the private network. In an initial search, the information system identifies a coarse level of information that is associated with network devices for a bad actor. After performing the coarse search, the information system then performs a finer and more target search for additional information that is specific to a previously identified entity and network devices. This process provides a technical improvement that increases information security by allowing the information system to generate a more robust and complete bad actor profile that identifies any other information that is associated with a potential bad actor.

Improving information security for the information system also improves the underlying network and the devices within the network. For example, when a data exfiltration attack occurs, there is an increase in the number of network resources and bandwidth that are consumed which reduces the throughput of the network. By preventing data exfiltration attacks, the system can prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network. Thus, the disclosed process improves the operation of the information system overall.

In one embodiment, the information system comprises a threat detection device that is configured to receive a data sample comprising information about a configuration for one or more network devices in a public network. The threat detection device is further configured to identify one or more threat indicators, where each threat indicator is associated with a configuration setting and each threat indicator identifies a value for the configuration setting. The threat detection device is further configured to compare the threat indicators to the data sample and to identify a first network device from among the one or more network devices in the public network that comprises a configuration that matches a threat indicator from among the one or more threat indicators. The threat detection device is further configured to generate a bad actor profile for the first network device that comprises a first device identifier for the first network device. The threat detection device is further configured to receive data traffic for a second network device in a private network, to identify a second device identifier within the data traffic, and to determine the second device identifier matches the first device identifier in the bad actor profile. The threat detection device is further configured to block data communications between the second network device in the private network and the first network device in the public network in response to determining that the second device identifier matches the first device identifier in the bad actor profile.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Information System Overview

Figure 1:
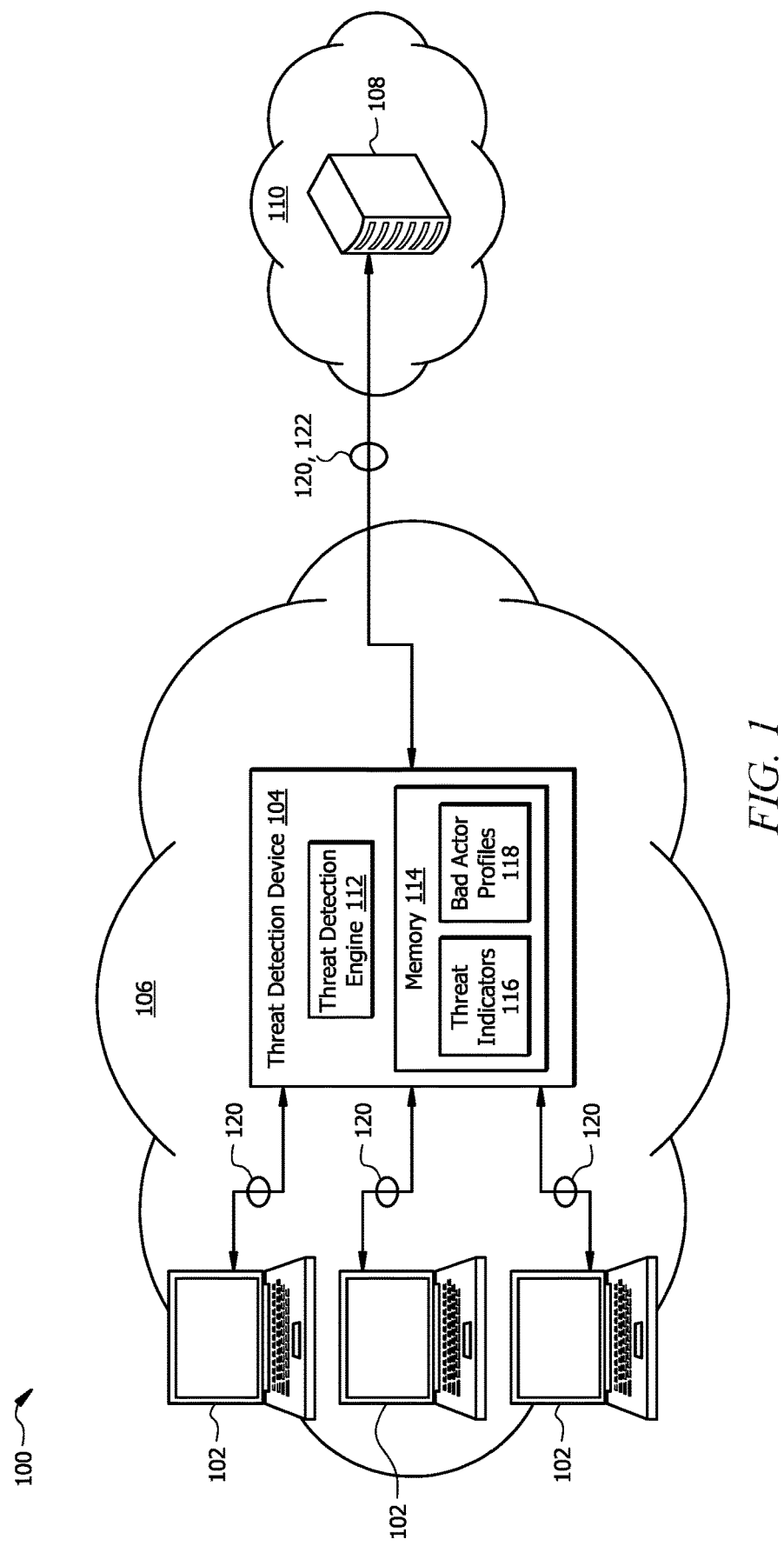
FIG. 1 is a schematic diagram for an information system configured with a threat detection device.

FIG. 1 is a schematic diagram of an embodiment of an information system 100 that is generally configured to identify network devices 108 within a public network 110 that correspond with entities that are potential bad actors. The information system 100 is further configured to generate a bad actor profile 118 for any identified entities that can be used to monitor data traffic within a private network 106 and to prevent attacks within the private network 106. This process provides improved information security by preemptively identifying and blocking communications with any network devices 108 in the public network 110 that are potential bad actors before they connect with or access network devices 102 in the private network 106.

Private Network

In one embodiment, the information system 100 comprises one or more network devices 102 and a threat detection device 104 that are in signal communication with each other within a private network 106. The private network 106 allows communication between and amongst the various components of the information system 100. This disclosure contemplates the private network 106 being any suitable network operable to facilitate communication between the components of the information system 100. The private network 106 may include any interconnecting system capable of transmitting audio, video, signals, data, messages, or any combination of the preceding. The private network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network Devices

A network device 102 is a hardware device that is generally configured to provide hardware and software resources to a user. Examples of the network device 102 include, but are not limited to, a smartphone, a tablet, a laptop, a computer, a smart device, or any other suitable type of device. Each network device 102 is configured to allow a user to communicate (i.e. send and receive) data with other network devices 102 in the private network 106. A network device 102 may also be configured to allow a user to communicate data 120 with network devices 108 that are in a public network 110 (e.g. the Internet). Examples of network device 108 in a public network 110 include, but are not limited to, a server, a database, a computer, a webcam, a smart device, or any other suitable type of network device. As an example, a user may employ a network device 102 to access a network device 108 in a public network 110 to access a website or download files from the network device 108.

Threat Detection Device

Examples of a threat detection device 104 include, but are not limited to, an access point, a server, a computer, or any other suitable type of network device. In one embodiment, a threat detection device 104 comprises a threat detection engine 112 and a memory 114. Additional details about the hardware configuration of the threat detection device 104 are described in FIG. 3. The memory 114 is configured to store threat indicators 116, bad actor profiles 118, and/or any other suitable type of data.

In one embodiment, the threat detection engine 112 is generally configured to facilitate communications between network devices 102 in the private network 106 and network devices 108 in the public network 110. For example, the threat detection engine 112 is configured to establish and enable network connections between a network device 102 in the private network 106 and a network device 108 in the public network 110 that allows the network device 102 to access data and/or download data from the network device 108. In one embodiment, the threat detection device 104 is configured to receive data that is communicated between a network device 102 in the private network 106 and a network device 108 in the public network 110. In this configuration, the network device 102 in the private network 106 sends data to the network device 108 in the public network 110 via the threat detection device 104. This means that the threat detection device 104 receives the data from the network device 102 in the private network 106 before forwarding the data to the network device 108 in the public network 110. Similarly, the threat detection device 104 is also configured to forward data from a network device 108 in the public network 110 to a network device 102 in the private network 106. This configuration allows the threat detection device 104 to intercept and monitor any data traffic that is communicated between a network device 102 in the private network 106 and a network device 108 in the public network 110.

The threat detection engine 112 is further configured to identify entities within the public network 110 that are potential bad actors based on a set of user-defined threat indicators 116. A threat indicator 116 is an attribute, pattern, or behavior that can be used to identify potential bad actors. In one embodiment, a threat indicator 116 is associated with a configuration setting or values of a configuration setting for a network device 108. Examples of threat indicators 116 include, but are not limited to, Secure Sockets Layer (SSL) certificate values, Hypertext Transfer Protocol (HTTP) values, HTTP responses, non-HTTP protocol values, server header values, shortcut or hyperlink addresses, JARM or JA3S fingerprint values, Hypertext Markup Language (HTML) page attributes (e.g. body, title, etc.) or values, or any other suitable type of attribute that can be used to identify a bad actor.

The threat detection engine 112 is further configured to generate a bad actor profile 118 for any entities that match one or more of the threat indicators 116 for a bad actor. The threat detection device 104 is configured to use bad actor profile 118 while monitoring data traffic of network device 102 in the private network 106 to identify communications with bad actors. A bad actor profile 118 generally comprises information that is associated with an entity that has been identified as a potential bad actor. For example, a bad actor profile 118 may comprise a device identifier for an entity or a network device 108 associated with an entity, an Internet Protocol (IP) address, a port number, a timestamp for when an entity was first identified, a timestamp for when an entity was last seen, a timestamp for when a search was performed, a search platform identifier for where an entity was found, search criteria for identifying an entity, a confidence score or value, a physical location address, any other suitable type of information, or combination, thereof. Examples of a device identifier include, but are not limited to, an IP address, an Internet domain name, a device name, a phone number, an email address, or any other suitable type of identifier. An example of the threat detection engine 112 monitoring data traffic and blocking any detected communications between a network device 102 and an entity that is associated with a bad actor profile 118 is described in more detail in FIG. 2.

Threat Detection Process

Figure 2:
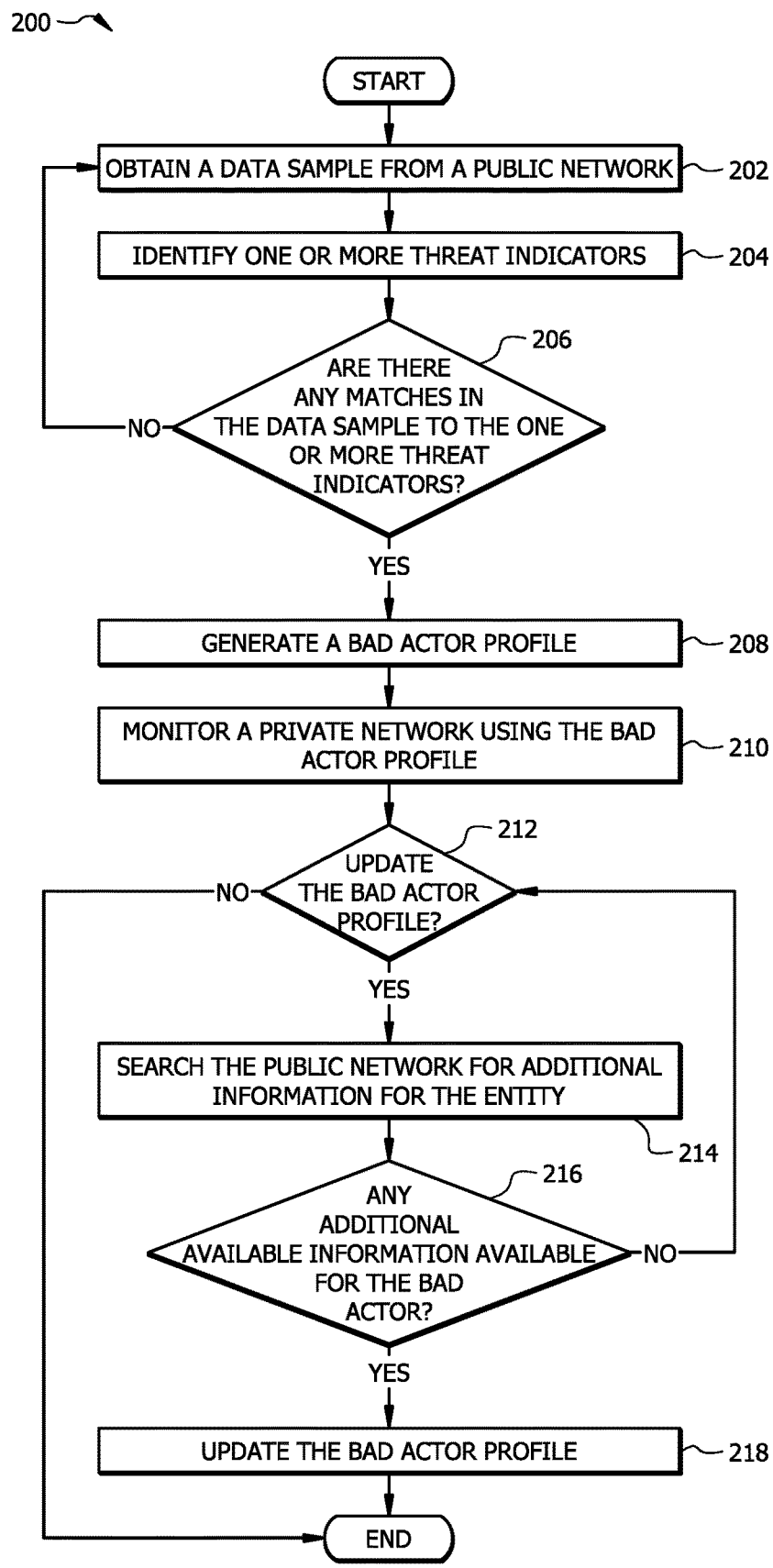
FIG. 2 is a flowchart of an embodiment of a threat detection process for the information system.

FIG. 2 is a flowchart of an embodiment of a threat detection process 200 for the information system 100. The information system 100 may employ process 200 to identify network devices 108 within the public network 110 that correspond with entities that are potential bad actors. The information system 100 may also employ process 200 to generate a bad actor profile 118 for any identified entities that can be used to monitor the private network 106 and to prevent attacks within the private network 106. This process provides improved information security by preemptively identifying and blocking communications with network devices 108 in the public network 110 that are potential bad actors before they connect with or access network devices 102 in the private network 106.

Bad Actor Detection Using a Bad Actor Profile

At operation 202, the threat detection device 104 obtains a data sample 122 from the public network 110. The threat detection device 104 obtains the data sample 122 by performing a search for various types of network devices 108 are connected to the public network 110 (e.g. the Internet). The threat detection device 104 may search one or more data sources (e.g. databases) to obtain the data sample 122. Examples of network devices 108 include, but are not limited to, servers, routers, webcams, smart devices, or any other suitable type of device. The data sample 122 generally comprises information for network devices 108 that are with different entities. For example, the data sample 122 may comprise device identifiers, configuration settings, IP addresses, Internet domain names, device names, phone numbers, email addresses, port numbers, HTML code, HTML pages, or any other sample type of information associated with an entity.

In one embodiment, the threat detection device 104 is configured to periodically perform searches to obtain data samples 122 from the public network 110. In this case, the threat detection device 104 waits a predetermined amount of time after obtaining a data sample 122 before performing an additional search to obtain another data sample 122. Each time the threat detection device 104 performs a search, the threat detection device 104 may use different search criteria to obtain a new data sample 122. In other embodiments, the threat detection device 104 may be configured to obtain a data sample 122 from the public network 110 on demand. In this case, the threat detection device 104 performs a search in response to a user input to initiate a search. The user input may also provide any search criteria that will be used to search the public network 110.

At operation 204, the threat detection device 104 identifies one or more threat indicators 116 that will be used to search for a bad actor. In one embodiment, a user may predefine or identify one or more threat indicators 116 that will be used. In this case, the threat detection device 104 uses the threat indicators 116 that were provided by the user to analyze the data sample 122 to determine whether a bad actor has been detected. In one embodiment, the one or more threat indicators 116 comprise a configuration setting for a network device 108 in the public network 110. In this example, a threat indicator 116 may identify one or more values of a configuration setting for a network device 108. In other examples, the threat indicators 116 may comprise SSL certificate values, HTTP values, HTTP responses, non-HTTP protocol values, server header values, shortcut or hyperlink addresses, JARM or JA3S fingerprint values, HTML page attributes or values, any other suitable type of attribute that can be used to identify a bad actor, or combination, thereof.

At operation 206, the threat detection device 104 determines whether there are any matches in the data sample 122 with the specified threat indicators 116. Here, the threat detection device 104 compares the information from the data sample 112 with the previously specified threat indicators 116. For example, the threat detection device 104 may compare a threat indicator 116 that is associated with an SSL certificate value to SSL certificate values in the data sample 122. As another example, the threat detection device 104 may compare threat indicators 116 associated with HTML page attributes or values to the HTML page attributes or values in the data sample 122. In other examples, the threat detection device 104 may compare any other threat indicators 116 to the information in the data sample 122. The threat detection device 104 returns to operation 202 in response to determining that there are no matches in the data sample 122 with the threat indicators 116. In this case, the threat detection device 104 determines that none of the information in the data sample 122 matches a threat indicator 116 for a potential bad actor and returns to operation 202 to obtain another data sample 122 using different search criteria. The threat detection device 104 proceeds to operation 208 in response to determining that there are matches in the data sample 122 with the threat indicators 116 for a potential bad actor. In this case, the threat detection device 104 determines that a potential bad actor has been detected and proceeds to operation 208 to record information from the data sample 122 for the entity that has been identified as a potential bad actor.

At operation 208, the threat detection device 104 generates a bad actor profile 118. After identifying a match between the data sample 122 with the threat indicators 116 for a potential bad actor, the threat detection device 104 first identifies one or more network devices 108 that are associated with the matching information. The threat detection device 104 then associates the identified network devices 108 with an entity that is a potential bad actor. After identifying the network devices 108 that are associated with a potential bad actor, the threat detection device 104 then generates a bad actor profile 118 for the entity that comprises any information from the data sample 122 that is associated with the identified network devices 108 for the entity. The threat detection device 104 can use this information from the bad actor profile 118 when monitoring the private network 106 to detect and restrict communications with the bad actor. An example of this process is described in operation 210. The bad actor profile 118 may comprise a device identifier for the entity or a network device 108 associated with the entity, an IP address, an Internet domain name, a device name, a phone number, an email address, a port number, a timestamp for a when the entity was identified, a timestamp for when the entity was last seen, a timestamp for when the search was performed, a search platform identifier for where the entity was found, search criteria for identifying the entity, a confidence score or value, any other suitable type of information associated with the entity, or combination, thereof.

At operation 210, the threat detection device 104 monitors the private network 106 using the bad actor profile 118. As an example, the threat detection device 104 may intercept or receive data traffic (e.g. data 120) between a network device 102 in the private network 106 and a network device 108 in the public network 110. The threat detection device 104 scans the data traffic to determine whether any information from the data traffic matches the information in the bad actor profile 118. For example, the threat detection device 104 may compare information from the data traffic to the device identifiers, IP addresses, Internet domain names, port numbers, or any other type of information in the bad actor profile 118. When the threat detection device 104 determines there is a match between any information in the data traffic and the bad actor profile 118, the threat detection device 104 may then restrict or block communications between the network device 102 in the private network 106 and the network device 108 in the public network 110 in response to detecting the match. For example, the threat detection device 104 may analyze the data traffic and determine that a device identifier (e.g. an IP address) for a target network device 108 in the public network 110 matches a device identifier in the bad actor profile 118. In this example, the threat detection device 104 determines that the network device 102 is attempting to communicate with a network device 108 that is associated with a known bad actor and blocks communications between the network device 102 in the private network 106 and the network device 108 in the public network 110. The threat detection device 104 will continue to use the bad actor profile 118 to monitor any data traffic between network devices 102 within the private network 106 and network devices 108 in the public network 110. This process allows the threat detection device 104 to preemptively prevent an attack by restricting communications with any network device 108 that have been previously associated with a bad actor profile 118. This process provided improved information security by allowing the threat detection device 104 to avoid any attacks by a bad actor by preventing the bad actor from connecting to the private network 106 and/or communicating with network devices 102 in the private network 106.

Enhancing and Updating a Bad Actor Profile

After generating a bad actor profile 118, the threat detection device 104 enhance or update the bad actor profile 118 by searching for additional information for the previously identified network device 108 of an entity that has been identified as a potential bad actor. The initial search that is performed in operation 202 provides a coarse level of information that is associated with a bad actor. After performing the coarse search, the threat detection device 104 then performs a finer and more target search for information that is specific to a previously identified entity. This process provides increased information security by allowing the threat detection device 104 to generate a more robust and complete bad actor profile 118 that identifies any other information that is associated with a potential bad actor.

At operation 212, the threat detection device 104 determines whether to update the bad actor profile 118. In one embodiment, the threat detection device 104 may be configured to update the bad actor profile 118 on demand. In this case, the threat detection device 104 will not automatically update the bad actor profile 118 until a user input is provided. For example, the threat detection device 104 will temporarily terminate process 200 and will later return to operation 212 to update the bad actor profile 118 in response to receiving a user's request to update the bad actor profile 118. The user input may comprise an identifier for the entity, a device identifier for a network device 108 associated with the entity, or any other suitable type of information associated with the entity.

In another embodiment, the threat detection device 104 may be configured to periodically update the bad actor profile 118 for the entity by performing additional searches for information associated with the entity. In this case, the threat detection device 104 waits a predetermined amount of time and then performs an additional search for information using a process similar to the process described in operation 202. The threat detection device 104 may be configured to wait one hour, one day, one week, one month, or any other suitable amount of time before performing an additional search. The threat detection device 104 proceeds to operation 214 in response to determining to update the bad actor profile 118. In this case, the threat detection device 104 proceeds to operation 214 to perform an additional search for information associated with the entity.

At operation 214, the threat detection device 104 performs another search in the public network 110 for additional information that is associated with the previously identified entity. The threat detection device 104 may perform a search using the same search criteria that were used in operation 202 or new search criteria. As an example, the threat detection device 104 may identify one or more attributes for the entity that is associated with the bad actor profile 118. Here, the threat detection device 104 identifies one or more attributes for the entity that will be used as search criteria for performing a new search. Examples of attributes include, but are not limited to, a device identifier for the entity or a network device 108 associated with the entity, an IP address, network packet response, network protocol response, an Internet domain name, a device name, a phone number, an email address, a port number, or any other suitable type of information that is associated with the entity. As another example, a user may provide new search criteria (e.g. threat indicators 116) for performing another search. In other examples, the threat detection device 104 may use a combination of attributes for the entity from the bad actor profile 118 and new search criteria from a user.

At operation 216, the threat detection device 104 determines whether any additional information is available for the entity. Here, the threat detection device 104 compares the information obtained from the search in operation 214 to the information in the bad actor profile 118 to determine whether there is any additional information available for the entity. The threat detection device 104 determines there is additional information available when information from the new search is not present in the bad actor profile 118 for the entity. The threat detection device 104 returns to operation 212 in response to determining that no additional information is available for the entity. In this case, the threat detection device 104 determines that there is no additional information to add to the bad actor profile 118 and returns to operation 212 to wait a predetermined amount of time before checking again for additional information associated with the entity. The threat detection device 104 proceeds to operation 218 in response to determining that additional information is available for the entity. In this case, the threat detection device 104 proceeds to operation 218 to add the additional information to the bad actor profile 118 that is associated with the entity.

At operation 218, the threat detection device 104 updates the bad actor profile 118. After determining that additional information is available for the entity, the threat detection device 104 adds the new information to the bad actor profile 118 for the entity. Here, the threat detection device 104 adds any new information from the search performed in operation 214 to the bad actor profile 118 for the entity. For example, the threat detection device 104 may add new device identifiers for other network devices 108 that are associated with the entity to the bad actor profile 118 for the entity. In other examples, the threat detection device 104 may add any new IP addresses, Internet domain names, port numbers, or any other type of new information that is associated with the entity to the bad actor profile 118 for the entity. By adding the additional information to the bad actor profile 118, the threat detection device 104 is able to generate a more comprehensive bad actor profile 118 that can be used to detect attacks while monitoring the private network 106.

Hardware Configuration for the Threat Detection Device

Figure 3:
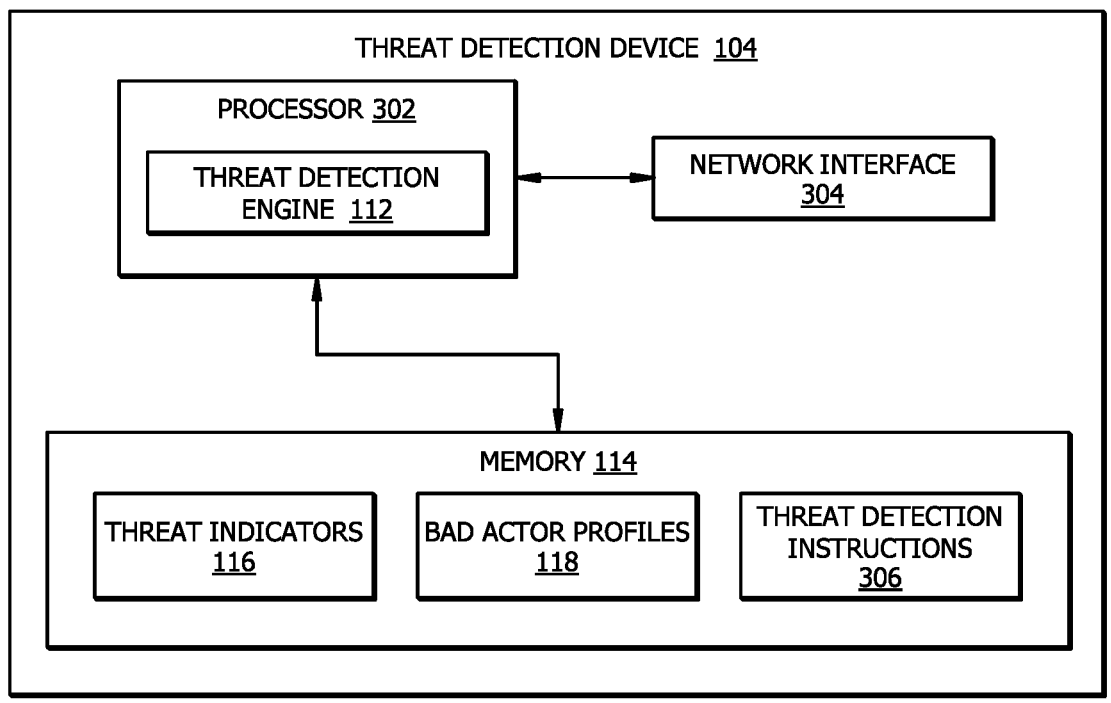
FIG. 3 is an embodiment of a threat detection device for the information system.

FIG. 3 is an embodiment of a threat detection device 104 for the information system 100. As an example, the threat detection device 104 may be a server, an access point, or a computer. The threat detection device 104 comprises a processor 302, a memory 114, and a network interface 304. The threat detection device 104 may be configured as shown or in any other suitable configuration.

Processor

The processor 302 is a hardware device that comprises one or more processors operably coupled to the memory 114. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 114 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute threat detection instructions 306 to implement the threat detection engine 112. In this way, processor 302 may be a special-purpose computer designed to implement the functions disclosed herein. In an embodiment, the threat detection engine 112 is implemented using logic units, FPGAs, ASICs, DSPs, or any other suitable hardware. The threat detection engine 112 is configured to operate as described in FIGS. 1 and 2. For example, the threat detection engine 112 may be configured to perform the operations of process 200 as described in FIG. 2.

Memory

The memory 114 is a hardware device that is operable to store any of the information described above with respect to FIGS. 1 and 2 along with any other data, instructions, logic, rules, or code operable to implement the function(s) described herein when executed by the processor 302. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store threat detection instructions 306, threat indicators 116, bad actor profiles 118, and/or any other data or instructions. The threat detection instructions 306 may comprise any suitable set of instructions, logic, rules, or code operable to execute the threat detection engine 112. The threat indicators 116 and the bad actor profiles 118 are configured similar to the threat indicators 116 and the bad actor profiles 118 described in FIGS. 1 and 2, respectively.

Network Interface

The network interface 304 is a hardware device that is configured to enable wired and/or wireless communications. The network interface 304 is configured to communicate data between network devices 102 in the private network 106, network devices 108 in the public network 110, and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A threat detection device, comprising:
    a network interface configured to communicate data traffic between one or more network devices in a private network and one or more network devices in a public network; and
    a processor operably coupled to the network interface, configured to:
        receive, via the network interface and from the public network, a data sample comprising configuration information for a first network device in the public network;
        obtain a plurality of threat indicators configured to guide analysis of the data sample, wherein:

each threat indicator of the plurality of threat indicators is associated with a configuration setting; and the configuration setting being used to identify at least one network device from the one or more network devices in the public network as a bad actor;

determine whether the data sample matches at least one threat indicator of the plurality of threat indicators;

in response to determining that the data sample matches the at least one threat indicator of the plurality of threat indicators, generate a bad actor profile for the first network device, wherein:

the bad actor profile comprises a first device identifier for the first network device; and the first device identifier identifies the first network device among the one or more network devices in the public network;

intercept, via the network interface, data traffic transmitted from the one or more network devices in the public network to a second network device in the private network;

determine whether first information in the data traffic matches second information in the bad actor profile;

in response to determining that the first information in the data traffic matches the second information in the bad actor profile, determine that the data traffic comprises communication between the first network device in the public network and the second network device in the private network;

determine a second device identifier within the data traffic;

determine that the second device identifier matches the first device identifier in the bad actor profile;

in response to determining that the second device identifier matches the first device identifier in the bad actor profile, determine that the data traffic comprises additional communication between the first network device in the public network and the second network device in the private network;

perform a search in the public network using the first device identifier for the first network device;

identify a third device identifier associated with the first network device based on results of the search;

store the third device identifier in the bad actor profile; and block data communications between the second network device in the private network and the first network device in the public network.

2. The device of claim 1, wherein the at least one threat indicator comprises a Secure Sockets Layer (SSL) certificate value.

3. The device of claim 1, wherein the at least one threat indicator comprises a Hypertext Transfer Protocol (HTTP) value.

4. The device of claim 1, wherein the first device identifier is an Internet Protocol (IP) address.

5. The device of claim 1, wherein the first device identifier is a port number.

6. The device of claim 1, wherein the first device identifier is an Internet domain name.

7. The device of claim 1, wherein the processor is further configured to:

search, via the network interface, the public network for additional information matching the first device identifier;

determine whether the public network comprises the additional information matching the first device identifier;

in response to determining that the public network comprises the additional information matching the first device identifier, determine that the additional information comprises additional bad actor information; and update the bad actor profile to include the additional information as the additional bad actor information.

8. A threat detection method, comprising:

receiving, via a network interface and from a public network, a data sample comprising configuration information for a first network device in the public network;

obtain a plurality of threat indicators configured to guide analysis of the data sample, wherein:

each threat indicator of the plurality of threat indicators is associated with a configuration setting; and the configuration setting being used to identify at least one network device from one or more network devices in the public network as a bad actor;

determining whether the data sample matches at least one threat indicator of the plurality of threat indicators;

in response to determining that the data sample matches the at least one threat indicator of the plurality of threat indicators, generating a bad actor profile for the first network device, wherein:

the bad actor profile comprises a first device identifier for the first network device; and the first device identifier identifies the first network device among the one or more network devices in the public network;

intercepting, via the network interface, data traffic transmitted from the one or more network devices in the public network to a second network device in a private network;

determining whether first information in the data traffic matches second information in the bad actor profile;

in response to determining that the first information in the data traffic matches the second information in the bad actor profile, determining that the data traffic comprises communication between the first network device in the public network and the second network device in the private network;

determining a second device identifier within the data traffic;

determining that the second device identifier matches the first device identifier in the bad actor profile;

in response to determining that the second device identifier matches the first device identifier in the bad actor profile, determining that the data traffic comprises additional communication between the first network device in the public network and the second network device in the private network;

performing a search in the public network using the first device identifier for the first network device;

identifying a third device identifier associated with the first network device based on results of the search;

storing the third device identifier in the bad actor profile; and blocking data communications between the second network device in the private network and the first network device in the public network.

9. The method of claim 8, wherein the at least one threat indicator comprises a Secure Sockets Layer (SSL) certificate value.

10. The method of claim 8, wherein the at least one threat indicator comprises a Hypertext Transfer Protocol (HTTP) value.

11. The method of claim 8, wherein the first device identifier is an Internet Protocol (IP) address.

12. The method of claim 8, wherein the first device identifier is a port number.

13. The method of claim 8, wherein the first device identifier is an Internet domain name.

14. A non-transitory computer-readable medium storing instructions that when executed by a processor cause the processor to:
- receive, via a network interface and from a public network, a data sample comprising configuration information for a first network device in the public network;
- obtain a plurality of threat indicators configured to guide analysis of the data sample, wherein:
  - each threat indicator of the plurality of threat indicators is associated with a configuration setting; and
  - the configuration setting being used to identify at least one network device from one or more network devices in the public network as a bad actor;
- determine whether the data sample matches at least one threat indicator of the plurality of threat indicators;
- in response to determining that the data sample matches the at least one threat indicator of the plurality of threat indicators, generate a bad actor profile for the first network device, wherein:
  - the bad actor profile comprises a first device identifier for the first network device; and
  - the first device identifier identifies the first network device among the one or more network devices in the public network;
- intercept, via the network interface, data traffic transmitted from the one or more network devices in the public network to a second network device in a private network;
- determine whether first information in the data traffic matches second information in the bad actor profile;
- in response to determining that the first information in the data traffic matches the second information in the bad actor profile, determine that the data traffic comprises communication between the first network device in the public network and the second network device in the private network;
- determine a second device identifier within the data traffic;
- determine that the second device identifier matches the first device identifier in the bad actor profile;
- in response to determining that the second device identifier matches the first device identifier in the bad actor profile, determine that the data traffic comprises additional communication between the first network device in the public network and the second network device in the private network;
- perform a search in the public network using the first device identifier for the first network device;
- identify a third device identifier associated with the first network device based on results of the search;
- store the third device identifier in the bad actor profile; and
- block data communications between the second network device in the private network and the first network device in the public network.

15. The non-transitory computer-readable medium of claim 14, wherein the at least one threat indicator comprises a Secure Sockets Layer (SSL) certificate value.

16. The non-transitory computer-readable medium of claim 14, wherein the at least one threat indicator comprises a Hypertext Transfer Protocol (HTTP) value.

17. The non-transitory computer-readable medium of claim 14, wherein the first device identifier is an Internet Protocol (IP) address.

* * * * *